United States Patent
Wang et al.

(10) Patent No.: US 10,365,496 B2
(45) Date of Patent: Jul. 30, 2019

(54) THREE DIMENSIONAL DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junwei Wang, Beijing (CN); Haifeng Yu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 32 days.

(21) Appl. No.: 15/506,144

(22) PCT Filed: Jul. 22, 2016

(86) PCT No.: PCT/CN2016/091038
§ 371 (c)(1),
(2) Date: Feb. 23, 2017

(87) PCT Pub. No.: WO2017/117973
PCT Pub. Date: Jul. 13, 2017

(65) Prior Publication Data
US 2018/0107010 A1 Apr. 19, 2018

(30) Foreign Application Priority Data
Jan. 7, 2016 (CN) .......................... 2016 1 0009261

(51) Int. Cl.
*G02B 27/22* (2018.01)
*G02B 27/26* (2006.01)

(52) U.S. Cl.
CPC ......... *G02B 27/2214* (2013.01); *G02B 27/26* (2013.01)

(58) Field of Classification Search
CPC .......... G02B 27/2214; G02B 27/22–26; H04N 13/00
USPC ........... 359/462–477; 348/42, 51–60; 349/15
See application file for complete search history.

(56) References Cited

U.S. PATENT DOCUMENTS

| | | | | |
|---|---|---|---|---|
| 5,708,449 A | * | 1/1998 | Heacock | G02B 7/12 345/7 |
| 2006/0098296 A1 | * | 5/2006 | Woodgate | G02B 27/2214 359/642 |

* cited by examiner

*Primary Examiner* — Kristina M Deherrera
(74) *Attorney, Agent, or Firm* — Ladas & Parry LLP

(57) ABSTRACT

A three dimensional (3D) display panel and a display device are provided. The 3D display panel includes a two dimensional (2D) display panel, an image separation device, a polarizing structure, an image isolation structure, a lens assembly and a shielding component. The 2D display panel includes a plurality of pixels; the image separation device is configured to allow each pixel to be separated into two adjacent image pixels; the polarizing structure is configured to allow two adjacent image pixels separated from the same pixel to respectively form an image pixel of a left-eye image and an image pixel of a right-eye image; the image isolation structure is configured to allow the left-eye image and the right-eye image to produce parallax; the lens assembly is configured to form 3D image pairs; and the shielding component is configured to separate the left-eye image and the right-eye image.

18 Claims, 5 Drawing Sheets

THREE DIMENSIONAL DISPLAY PANEL AND DISPLAY DEVICE

TECHNICAL FIELD

The present invention relates to a three dimensional (3D) display panel and a display device.

BACKGROUND

In daily life, people utilize two eyes to identify objects in a 3D space. In the process of identifying certain object, as there is certain distance between the two eyes, images respectively entering the left eye and the right eye are different due to the distance when the left eye and the right eye view the object, and there is difference in both angle and perspectivity; "stereoscopic vision" will be produced when the images are reflected in the brain; and the two images are combined together to produce 3D effect, so that the fore-and-aft relationship of the object can be determined.

Currently, 3D display technology mainly includes glasses type and glasses-free type without wearing the glasses. The glasses 3D display technology has been very maturely developed, but people cannot get rid of the restrict of special glasses, so that both the application range and the use comfort thereof can be greatly reduced. As the glasses are not required for wearing, the glasses-free 3D display technology receives more and more attention and becomes a development trend in the 3D display technology in the future. Thus, the glasses-free 3D display technology becomes the current research focus.

In the prior art, 3D film sources must be produced in the process of achieving glasses-free 3D display, but the 3D film sources are currently in deficiency. In addition, the 3D effect can only be achieved in the prior art by processing 2D film sources via computers and requiring image chips of displays to support operations.

SUMMARY

Some embodiments of the disclosure provide a three dimensional (3D) display panel, comprising a two dimensional (2D) display panel, an image separation device, a polarizing structure, an image isolation structure, a lens assembly and a shielding component, wherein the 2D display panel includes a plurality of pixels arranged in an array along a row direction and a column direction and is configured to play a 2D film source; the image separation device is configured to allow each pixel to be separated into two adjacent image pixels; the image pixels are disposed in a same plane; there is no gap between adjacent image pixels or the gap is opaque; the polarizing structure is configured to allow two adjacent image pixels separated from the same pixel to respectively form an image pixel of a left-eye image and an image pixel of a right-eye image before the image pixels are imaged through the lens assembly; the image isolation structure is configured to allow the left-eye image and the right-eye image to produce parallax before the image pixels are imaged through the lens assembly; the lens assembly is configured to allow the image pixels to form 3D image pairs; and the shielding component is configured to separate the left-eye image and the right-eye image.

In some examples, the image separation device includes a plurality of lenticular prism lenses which are parallel to each other and sequentially arranged; and each prism lens is arranged corresponding to one pixel on a section perpendicular to an extension direction of the prism lens.

In some examples, the extension direction of the prism lens is parallel to the column direction.

In some examples, upon the gap between the adjacent image pixels is opaque, a light blocking layer is disposed on the prism lens; and an orthographic projection area of the light blocking layer on a plane provided with the image pixels is superposed with the gap between the adjacent image pixels.

In some examples, the 3D display panel further comprises an imaging surface for showing the image pixels, wherein the polarizing structure includes: a polarizing layer disposed on a side of the 2D display panel facing the image separation device, a phase retardation film disposed on the imaging surface, and an analyzer layer disposed on a side of the lens assembly facing the imaging surface; or polarizing layers which are respectively disposed on two adjacent surfaces of the prism lenses facing the image isolation structure and of which polarization directions are perpendicular to each other, and an analyzer layer disposed on the imaging surface; or polarizing layers which are respectively disposed on two adjacent surfaces of the prism lenses facing the image isolation structure and of which the polarization directions are perpendicular to each other, and an analyzer layer disposed on a side of the lens assembly facing the imaging surface.

In some examples, the image isolation structure includes a first light-shielding layer and a second light-shielding layer disposed on the imaging surface; the first light-shielding layer and the second light-shielding layer are respectively disposed on two sides of the imaging surface in the row direction; the first light-shielding layer disposed on one side of the imaging surface is configured to shield partial image pixels for forming the right-eye image; and the second light-shielding layer disposed on the other side of the imaging surface is configured to shield the same number of image pixels for forming the left-eye image.

In some examples, the light-shielding layers are strips which are extended parallel to the column direction of the array; the first light-shielding layer is configured to shield a plurality of columns of image pixels of the right-eye image disposed on one side of the imaging surface; and the second light-shielding layer is configured to shield a plurality of columns of image pixels of the left-eye image disposed on the other side of the imaging surface.

In some examples, the lens assembly includes a first lens group and a second lens group; and the first lens group and the second lens group are symmetrical relative to a normal line at a center position of a plane provided with the 2D display panel.

In some examples, a distance between an axis provided with a focus of each lens in the first lens group and the normal line at the center position of the plane provided with the 2D display panel is an integral multiple of a width of the pixel in the X direction; and a distance between an axis provided with a focus of each lens in the second lens group and the normal line at the center position of the plane provided with the 2D display panel is an integral multiple of a width of the pixel in the X direction.

In some examples, the shielding component is a grating or a prism lens.

In some examples, the 3D display panel further comprises a projecting plane for showing the 3D image pairs, and a light valve controller disposed on the projecting plane, wherein the light valve controller is configured to control brightness of the 3D image pairs.

In some examples, the 3D display panel further comprises a housing which allows an integration of the 2D display panel, the image separation device, the image isolation structure, the polarizing structure, the lens assembly and the shielding component.

In some examples, the lens assembly is configured to allow the image pixels to form inverted and mutually intersected 3D image pairs.

In some examples, the polarizing structure allows image light for forming the left-eye image and the right-eye image have different polarization directions.

In some examples, the lens assembly is configured to allow an edge of the left-eye image and an edge of the right-eye image in the 3D image pair to be coincided with each other.

Some embodiments of the disclosure provide a display device, comprising the 3D display panel as mentioned above.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the embodiments are only partial embodiments of the present invention but not all the embodiments. All the other embodiments obtained by those skilled in the art without creative efforts on the basis of the embodiments of the present invention illustrated shall fall within the scope of protection of the present invention.

Embodiments of the present invention provide a three dimensional (3D) display panel and a display device, which can achieve glasses-free 3D display without producing 3D film sources and processing 2D film sources.

Detailed description will be given below to the 3D display panel provided by the embodiments of the present invention with reference to the accompanying drawings.

Figure 1:
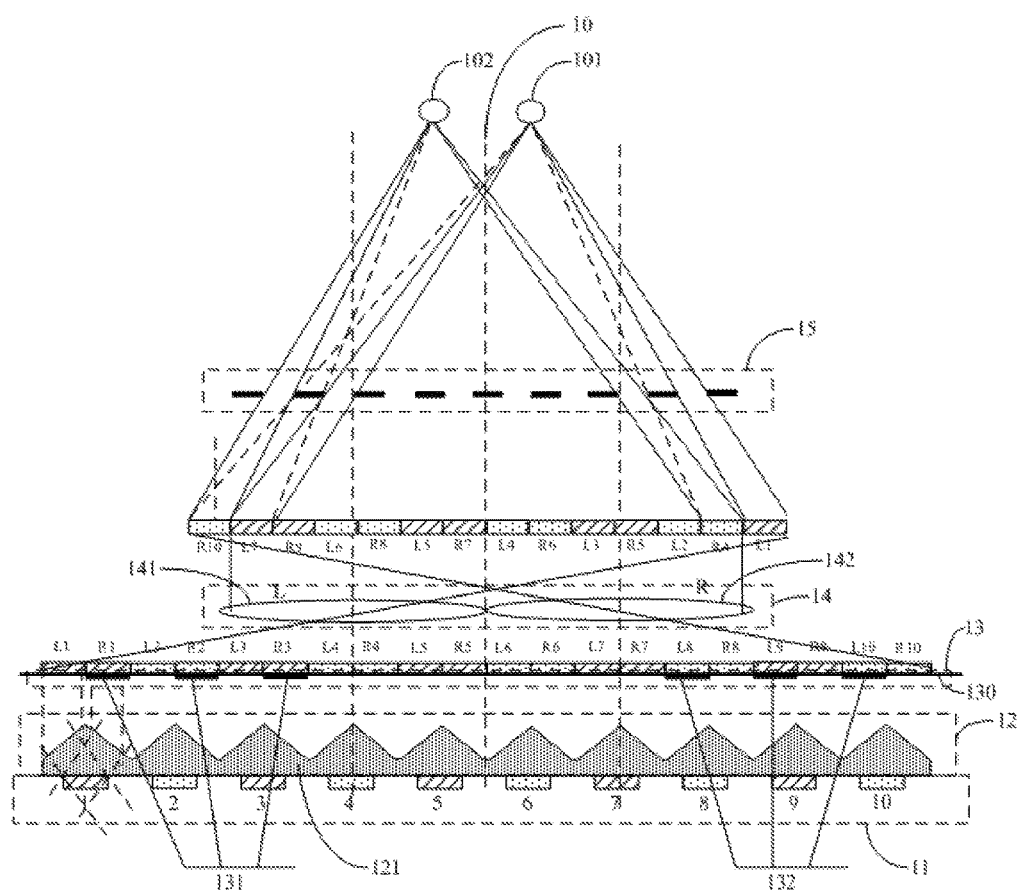
FIG. 1 is a schematic structural view of a 3D display panel provided by the embodiment of the present invention.

As illustrated in FIG. 1, the embodiment of the present invention provides a 3D display panel, which comprises a 2D display panel 11, an image separation device 12, a polarizing structure (not shown in the figure), an image isolation structure 13, a lens assembly 14 and a light-shielding component 15.

The 2D display panel 11 includes a plurality of pixels arranged in an array, e.g., a pixel 1, a pixel 2, a pixel 3, a pixel 4, a pixel 5, a pixel 6, a pixel 7, a pixel 8, a pixel 9 and a pixel 10 as shown in the figure, and is configured to play 2D film sources.

The image separation device 12 is configured to allow each pixel to be separated into two adjacent image pixels; the image pixels are adjacent to each other one by one and disposed in the same plane; and there is no gap between adjacent image pixels or the gaps are opaque. FIG. 1 only illustrates the case that there is no gap between the adjacent image pixels.

The polarizing structure is configured to allow two adjacent image pixels separated from the same pixel to respectively form a left-eye image (an image pixel of the left-eye image) and a right-eye image (an image pixel of the right-eye image) before the image pixels are imaged through the lens assembly 14, for instance: allowing an image pixel L1 separated from the pixel 1 to form the left-eye image, and allowing an image pixel R1 separated from the pixel 1 to form the right-eye image; allowing an image pixel L2 separated from the pixel 2 to form the left-eye image, and allowing an image pixel R2 separated from the pixel 2 to form the right-eye image; and allowing an image pixel L3 separated from the pixel 3 to form the left-eye image, and allowing an image pixel R3 separated from the pixel 3 to form the right-eye image.

The pixel isolation structure 13 is configured to produce parallax between the left-eye image and the right-eye image before the image pixels are imaged through the lens assembly 14.

The lens assembly 14 is configured to allow the image pixels to form isometric, inverted and intersected 3D image pairs.

The shielding component 15 is configured to separate the left-eye image and the right-eye image. Thus, in the formed 3D image pair, the left-eye image can only enter the left eye 101 and the right-eye image can only enter the right eye 102. For instance, as for the formed 3D image pair L1 and R4, in the 3D image pair, L1 is a left-eye image and R4 is a right-eye image; L1 can only enter the left eye 101; and R4 can only enter the right eye 102.

The pixel spacing in the 2D display panel in the embodiment of the present invention is large, so that two image pixels formed subsequently by each pixel through the pixel separation device cannot be overlapped. The specific pixel spacing is specifically set according to actual demands. For instance: the 2D display panel may adopt a liquid crystal display (LCD) panel in the prior art, but the spacing between pixels in the LCD panel is small. Thus, partial pixels in the LCD panel can be subjected to shielding processing in actual application.

In some examples, as illustrated in FIG. 1, the pixel separation device 12 in the embodiment of the present invention includes a plurality of prism lenses 121 arranged in an array; and each prism lens 121 is arranged corresponding to one pixel. The prism lens in the embodiment of the present invention may adopt a lenticular prism lens. The function of the lenticular prism lens is to separate each pixel into two same image pixels and allow the image pixels to be adjacent to each other one by one or have small gap by parameter design. For instance, the image pixels can be adjacent to each other one by one or have small gap by setting the inclination angle between each plane in the lenticular prism lens and the horizontal plane and setting appropriate refractive index of the lenticular prism lens.

For instance, the extension direction of the lenticular prism lens is parallel to the column direction of the pixel array of the 2D display panel. In addition, each column of pixels may correspond to one lenticular prism lens. That is to say, each prism lens is arranged corresponding to one pixel on a section perpendicular to the extension direction of the prism lens. The lenticular prism lenses may be sequentially arranged along the row direction.

When the gap between the adjacent image pixels is small, the gap must be opaque. For instance, a light blocking layer is disposed on the lenticular prism lens. An orthographic projection area of the light blocking layer on a plane provided with the image pixels is superposed with the gap area between the adjacent image pixels. For instance, a light blocking layer is disposed in a corresponding area at the top of the lenticular prism lens, so that an orthographic projection area of the light blocking layer on the plane provided with the image pixels is superposed with the gap area between the adjacent image pixels. Thus, the gap areas between the adjacent image pixels can be guaranteed to be black dark areas, and hence the phenomenon of light leakage can be effectively avoided.

In some examples, as illustrated in FIG. 1, the 3D display panel provided by the embodiment of the present invention further comprises an imaging surface 130 for showing the image pixels; the image isolation structure 13 includes a first light-shielding layer 131 and a second light-shielding layer 132 disposed on the imaging surface 130; the first light-shielding layer 131 and the second light-shielding layer 132 are respectively disposed on both sides of the imaging surface 130; the first light-shielding layer 131 disposed on one side of the imaging surface 130 is configured to shield partial image pixels for forming the right-eye image at border positions; and the second light-shielding layer 132 disposed on the other side of the imaging surface 130 is configured to shield the same number of image pixels for forming the left-eye image at border positions.

For instance, the first light-shielding layer 131 is disposed on one side of the imaging surface 130 in the row direction, and the second light-shielding layer 132 is disposed on the other side of the imaging surface 130 in the row direction. For instance, the light-shielding layer is a strip which is extended parallel to the column direction of the array; the first light-shielding layer 131 is configured to shield a plurality of columns of image pixels of the right-eye image disposed on one side of the imaging surface; and the second light-shielding layer 132 is configured to shield a plurality of columns of image pixels of the left-eye image disposed on the other side of the imaging surface.

For instance, in the embodiment of the present invention, the first light-shielding layer 131 is disposed on the left of the imaging surface 130, and the second light-shielding layer 132 is disposed on the right of the imaging surface 130; the first light-shielding layer 131 is configured to shield image pixels R1, R2 and R3 for forming the right-eye image; and the second light-shielding layer 132 is configured to shield image pixels L8, L9 and L10 for forming the left-eye image. Thus, 3 columns of pixels are removed from pixels for forming the left-eye image, and 3 columns pixels are removed from pixels for forming the right-eye image, so that an image with parallax is obtained in the case of 3D display. Of course, the number of the image pixels for forming the right-eye image shielded by the first light-shielding layer may be set according to actual conditions, which is not limited to the case that three columns of image pixels are shielded; and similarly, the number of the image pixels for forming the left-eye image shielded by the second light-shielding layer may also be set according to actual conditions, which is not limited to the case that three columns of image pixels are shielded. In addition, in actual design, the number of the image pixels shielded by the first light-shielding layer may also be different from the number of the image pixels shielded by the second light-shielding layer.

In some examples, as illustrated in FIG. 1, the lens assembly 14 in the embodiment of the present invention includes a first lens group 141 and a second lens group 142. The first lens group 141 and the second lens group 142 are symmetrical relative to a normal line 10 at a center position of a plane provided with the 2D display panel. For instance, in the embodiment of the present invention, the first lens group 141 includes a plurality of convex lenses, and the second lens group 142 includes a plurality of convex lenses.

For instance, as illustrated in FIG. 1, in the embodiment of the present invention, the distance between an axis provided with the focus of each lens in the first lens group 141 and the normal line 10 at the center position of the plane provided with the 2D display panel 11 is an integral multiple of the width of the pixel in the X direction; and the distance between an axis provided with the focus of each lens in the second lens group 142 and the normal line 10 at the center position of the plane provided with the 2D display panel 11 is an integral multiple of the width of the pixel in the X direction. In the embodiment of the present invention, the width of the pixel in the X direction refers to the width of the pixel in the horizontal direction.

In some examples, as illustrated in FIG. 1, the light-shielding component 15 in the embodiment of the present invention is a grating or a lenticular prism lens. The effect of the grating in the embodiment of the present invention is the same with that of a 3D grating in the prior art. The glasses-free 3D effect is finally achieved through the grating. The prism lens in the embodiment of the present invention is the same with a prism lens for achieving 3D effect in the prior art. Glasses-free 3D display or glasses 3D display is achieved through the prism lens.

In some examples, the polarizing structure in the 3D display panel provided by the embodiment of the present invention includes:

a polarizing layer disposed on a side of the 2D display panel facing the image separation device, a phase retardation film disposed on the imaging surface, and an analyzer layer disposed on a side of the lens assembly facing the imaging surface; or polarizing layers which are disposed on left surfaces and right surfaces (for instance, two adjacent surfaces facing the image isolation structure) of the prism lenses and of which the polarization direction is perpendicular to each other, and an analyzer layer disposed on the imaging layer; or polarizing layers which are disposed on left surfaces and right surfaces (for instance, two adjacent surfaces facing the image isolation structure) of the prism lenses and of which the polarization direction is perpendicular to each other, and an analyzer layer disposed on a side of the lens assembly facing the imaging surface.

Detailed description will be given below to the design mode of the polarizing structure in the embodiment of the present invention with reference to the accompanying drawings.

Figure 2:
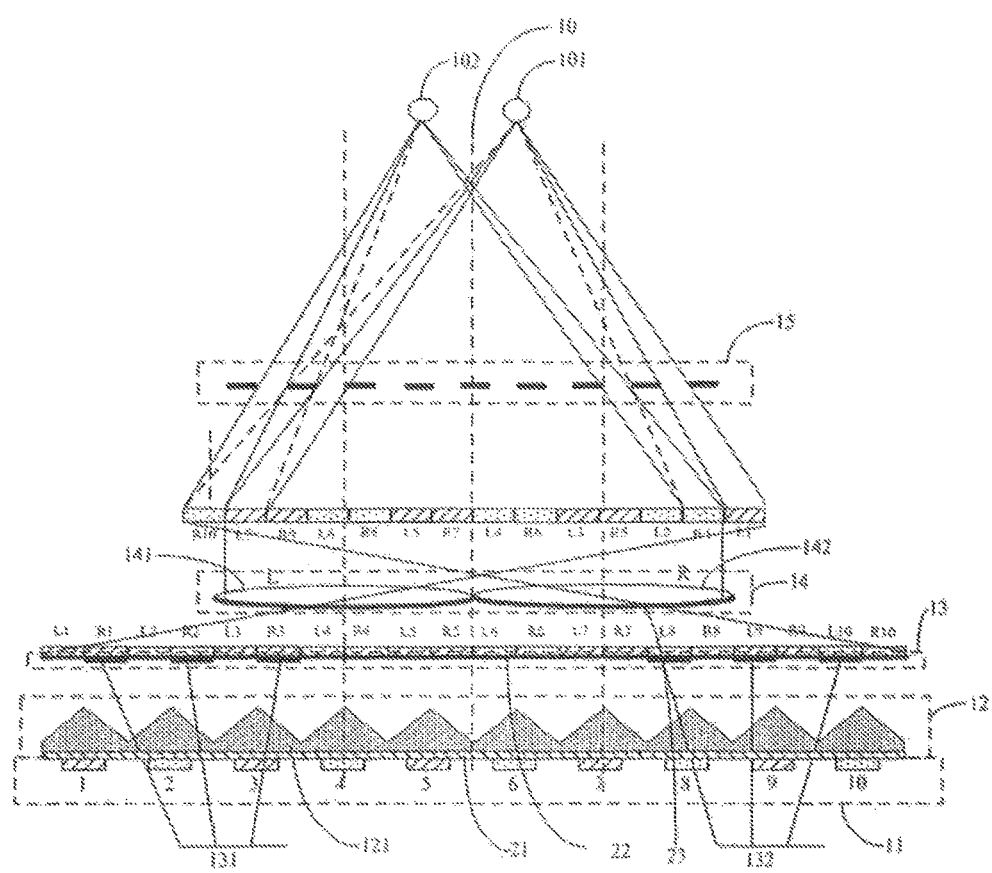
FIG. 2 is a schematic diagram of a polarizing structure in the 3D display panel provided by the embodiment of the present invention.

First Mode:

As illustrated in FIG. 2, the polarizing structure in the embodiment of the present invention includes a polarizing layer 21 disposed on a side of the 2D display panel 11 facing the image separation device 12, a phase retardation film 22 disposed on the imaging surface 130, and an analyzer layer 23 disposed on a side of the lens assembly 14 facing the imaging surface 130. Due to the arrangement of the polarizing layer 21, emergent light is polarized light; due to the arrangement of the phase retardation film 22, odd columns of image pixels L1, L2, L3, L4, L5, L6, L7, L8, L9 and L10 and even columns of image pixels R1, R2, R3, R4, R5, R6, R7, R8, R9 and R10 are in polarization state perpendicular to each other after running through the film retardation film 22; and due to the arrangement of the analyzer layer 23, the first lens group 141 can only image the odd columns of image pixels, and the second lens group 142 can only image the even columns of image pixels.

For instance, as for a 2D film source played by the 2D display panel 11 in the embodiment of the present invention, after running through the first lens group 141 in the embodiment of the present invention, the odd columns of image pixels form isometric inverted images, and as the second light-shielding layer 132 shields 3 odd columns of image pixels, the formed isometric inverted images are shifted to the right for 3 columns of pixels; and after running through the second lens group 142 in the embodiment of the present invention, the even columns of image pixels form isometric inverted images, and as the first light-shielding layer 131 shields 3 even columns of image pixels, the formed isometric inverted images are shifted to the left for 3 columns of pixels. As seen from the figure, at this point, the shielding effect of the 3 columns of pixels on the edge of the odd columns and the even columns is eliminated, and images which are paired again and intersected with each other are formed. The images are complete 3D image pairs. In actual design, as the inverted images are formed through the lens assembly, film sources of the left eye and the right eye must be adjusted according to actual conditions.

Figure 3:
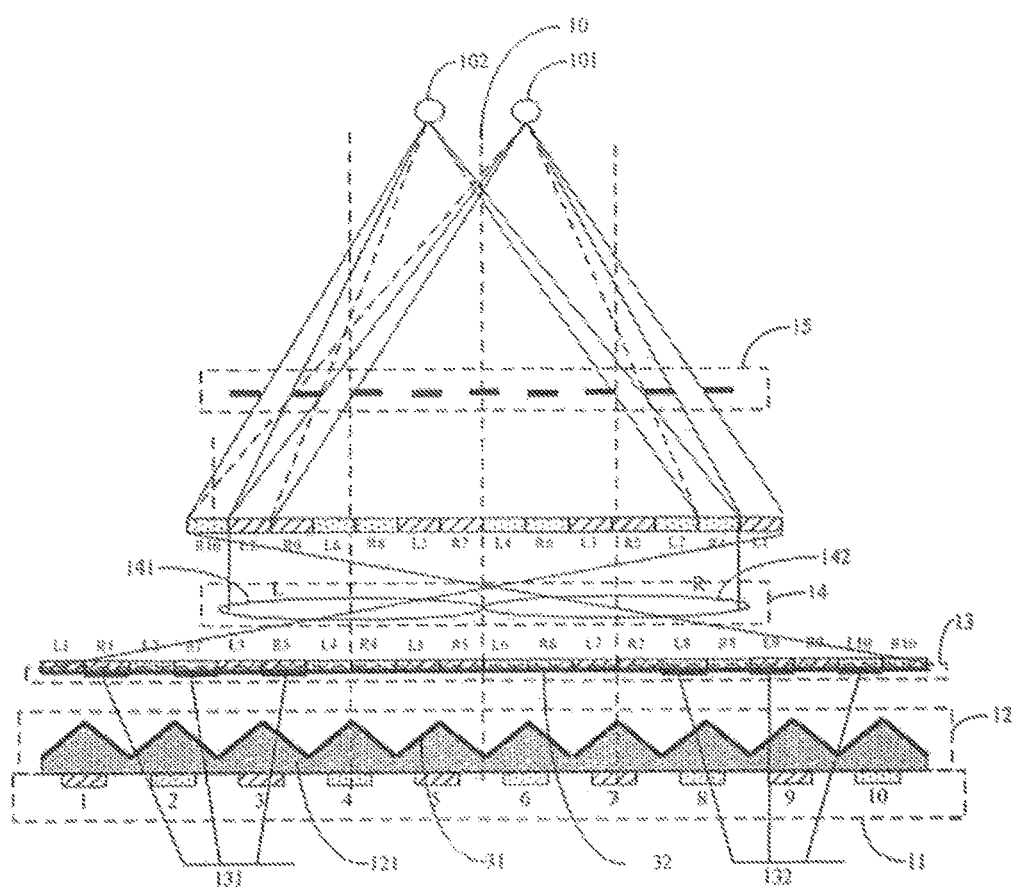
FIG. 3 is another schematic diagram of the polarizing structure in the 3D display panel provided by the embodiment of the present invention.

Second Mode:

As illustrated in FIG. 3, the polarizing structure in the embodiment of the present invention includes polarizing layers 31 which are disposed on left surfaces and right surfaces of the prism lenses and of which the polarization direction is perpendicular to each other, and an analyzer layer 32 disposed on the imaging surface 130. At this point, light entering the prism lens after running through the 2D display panel is ordinary light. As the polarizing layers 31 perpendicular to each other are disposed on the left surface and the right surface of the prism lens, the ordinary light running through the prism lens becomes polarized light.

In the embodiment of the present invention, the polarizing layers 31 perpendicular to each other are disposed on the left surface and the right surface of the prism lens; the function of the polarizing layer 31 is the same with the function of the phase retardation film arranged in the first mode, so that the odd columns of image pixels L1, L2, L3, L4, L5, L6, L7, L8, L9 and L10 and the even columns of image pixels R1, R2, R3, R4, R5, R6, R7, R8, R9 and R10 are in polarization state perpendicular to each other after running through the polarizing layers 31. For instance, the polarizing layers perpendicular to each other may be respectively evaporated on the left surface and the right surface of the prism lens or photo-induced orientation may be performed after polyimide (PI) is coated, and different polarization functions are achieved via different illumination directions. Due to the arrangement of the analyzer layer 32, the first lens group 141 can only image the odd columns of image pixels, and the second lens group 142 can only image the even columns of image pixels.

Figure 4:
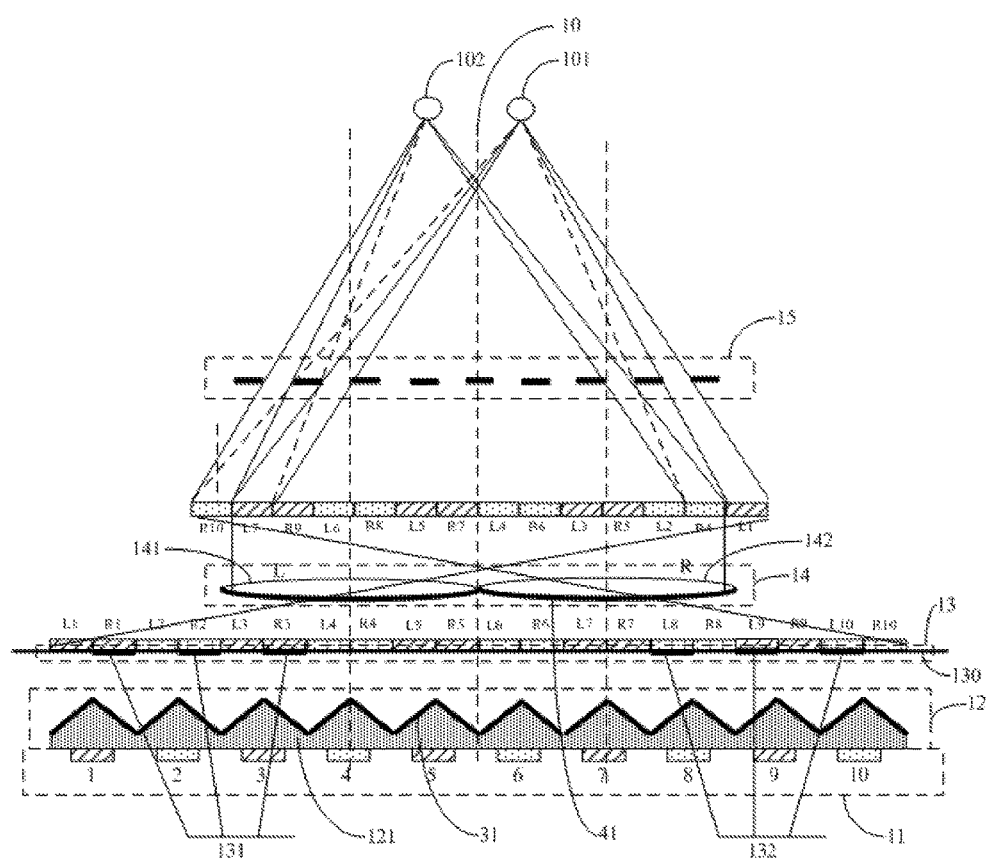
FIG. 4 is still another schematic diagram of the polarizing structure in the 3D display panel provided by the embodiment of the present invention.

Third Mode:

As illustrated in FIG. 4, the polarizing structure in the embodiment includes polarizing layers 31 which are disposed on left surfaces and right surfaces of the prism lenses and of which the polarization direction is perpendicular to each other, and an analyzer layer 41 disposed on a side of the lens assembly facing the imaging surface. Due to the arrangement of the analyzer layer 41, the first lens group 141 can only image the odd columns of image pixels, and the second lens group 142 can only image the even columns of image pixels.

The setting of the polarizing structure in the embodiment of the present invention may be flexible. The polarizing structure may be arranged at different positions as long as the objective of separating the left image and the right image can be achieved. The embodiment is not limited to the above three setting modes. The optical parameter design in the embodiment of the present invention satisfies general geometrical optics principle. No further description will be given here.

Taking the case that the polarizing structure in the embodiment of the present invention is the first mode as an example, the imaging process of the embodiment of the present invention is that: firstly, image polarization is achieved through the polarizing layer disposed on a side of the 2D display panel facing the image separation device; secondly, image separation is achieved through the image separation device; thirdly, the polarization states perpendicular to each other is formed through the phase retardation film disposed on the imaging surface; fourthly, edge image isolation is achieved through the light-shielding layers on the imaging surface; fifthly, 3D light sources are produced by forming secondary superposition images by image shift and image analyzing through the arranged lens assembly and the analyzer layer disposed on the lens assembly; and finally, 3D effect is obtained by achieving left and right eye separation through the shielding component.

Figure 5:
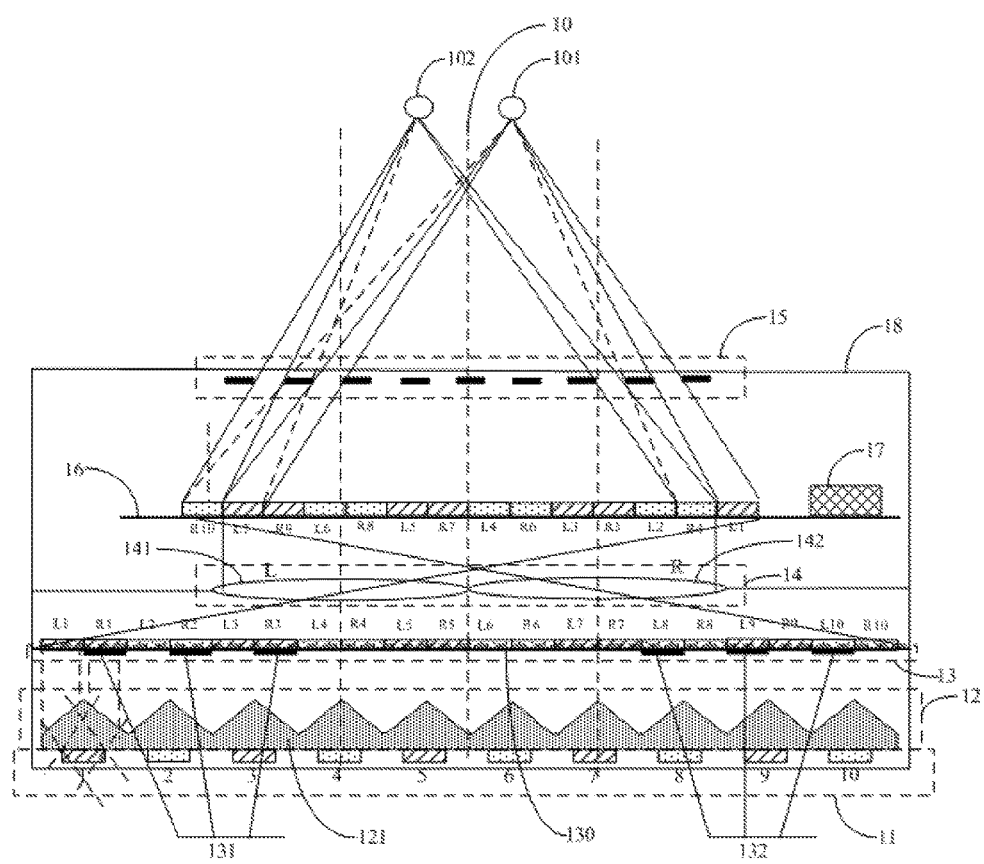
FIG. 5 is a schematic structural view of another 3D display panel provided by the embodiment of the present invention.

In some examples, as illustrated in FIG. 5, the 3D display panel provided by the embodiment of the present invention further comprises a projecting plane 16 disposed between the lens assembly 14 and the shielding component 15. The projecting plane 16 is used for showing the 3D image pairs. After the projecting plane 16 is arranged, a light valve controller 17 may be further disposed on the projecting plane 16. The light valve controller 17 is configured to control the brightness of the 3D image pairs, so that the brightness of pixels at different areas in the 3D image pairs can be different. Thus, the effect of depth difference can be increased, and the 3D image is subjected to depth rendering, so that the 3D effect can be further improved.

In some examples, as illustrated in FIG. 5, the 3D display panel provided by the embodiment of the present invention further comprises a housing 18 for the integration of the 2D display panel 11, the image separation device 12, the image isolation structure 13, the polarizing structure, the lens assembly 14 and the shielding component 15.

For instance, in the embodiment of the present invention, optical medium with refractive index may also be filled between the prism lens and the lens assembly and between the lens assembly and the grating, so that the medium is matched with the prism lens and the lenses in use to form optical paths as shown in FIG. 5. In addition, optical components in the 3D display panel provided by the embodiment of the present invention may be adjusted according to the position of a viewer, so that better matching effect can be obtained.

As for the 3D image pair, the left-eye image and the right-eye image therein are isometric, and the edge of the left-eye image and the edge of the right-eye image in the 3D image pair are coincided with each other. Thus, the 3D image pair is actually formed by the integration of the left-eye image and the right-eye image with parallax. For instance, image light of the polarizing structure for forming the left-eye image and the right-eye image has different polarization directions, so that the left-eye image and the right-eye image can be separated.

The embodiment of the present invention further provides a display device, which comprises the foregoing 3D display panel. The display device may be a liquid crystal display (LCD), an LCD TV, an organic light-emitting diode (OLED) display, an OLED TV, etc.

In summary, the embodiment of the present invention provides a 3D display panel, which comprises a 2D display panel, an image separation device, an image isolation structure, a polarizing structure, a lens assembly and a shielding component, wherein: the 2D display panel includes a plurality of pixels arranged in an array and is configured to play 2D film sources; the image separation device is configured to allow each pixel to be separated into two adjacent image pixels; the image pixels are adjacent to each other one by one and disposed in the same plane; there is no gap between adjacent image pixels or the gaps are opaque; the polarizing structure is configured to allow two adjacent image pixels separated from the same pixel to respectively form a left-eye image and a right-eye image before the image pixels are imaged through the lens assembly; the image isolation structure is configured to produce parallax between the left-eye image and the right-eye image before the image pixels are imaged through the lens assembly; the lens assembly is configured to allow the image pixels to form isometric, inverted and intersected 3D image pairs; and the shielding component is configured to separate the left-eye image and the right-eye image. Due to the above settings, glasses-free 3D display can be achieved without producing 3D film sources and processing 2D film sources.

The foregoing is only the embodiments of the present invention and not intended to limit the scope of protection of the present invention. The scope of protection of the present invention should be defined by the appended claims.

The application claims priority to the Chinese patent application No. No. 201610009261.9, filed Jan. 7, 2016, the disclosure of which is incorporated herein by reference as part of the application.

The invention claimed is:

1. A three dimensional (3D) display panel, comprising a two dimensional (2D) display panel, an image separation device, a polarizing structure, an image isolation structure, a lens assembly and a shielding component, wherein the 2D display panel includes a plurality of pixels arranged in an array along a row direction and a column direction and is configured to play a 2D film source;

the image separation device is configured to allow each pixel to be separated into two adjacent image pixels; the image pixels are disposed in a same plane; there is no gap between adjacent image pixels or the gap is opaque, the image pixels are located on a side of the image separation device away from the pixel, and image light emitted by each pixel is separated into two beams of light propagating in different directions by the image separation device to form the two adjacent image pixel;

the polarizing structure is configured to allow two adjacent image pixels separated from the same pixel to respectively form an image pixel of a left-eye image and an image pixel of a right-eye image before the image pixels are imaged through the lens assembly;

the image isolation structure is configured to allow the left-eye image and the right-eye image to produce parallax before the image pixels are imaged through the lens assembly;

the lens assembly is configured to allow the image pixels to form isometric 3D image pairs; and the shielding component is configured to separate the left-eye image and the right-eye image.

2. The 3D display panel according to claim 1, wherein the image separation device includes a plurality of lenticular prism lenses which are parallel to each other and sequentially arranged; and each prism lens is arranged corresponding to one pixel on a section perpendicular to an extension direction of the prism lens, the extension direction of the prism lens is parallel to the column direction.

3. The 3D display panel according to claim 2, wherein upon the gap between the adjacent image pixels is opaque, a light blocking layer is disposed on the prism lens; and an orthographic projection area of the light blocking layer on a plane provided with the image pixels is superposed with the gap between the adjacent image pixels.

4. The 3D display panel according to claim 2, wherein upon the gap between the adjacent image pixels is opaque, a light blocking layer is disposed on the prism lens; and an orthographic projection area of the light blocking layer on a plane provided with the image pixels is superposed with the gap between the adjacent image pixels.

5. The 3D display panel according to claim 2, further comprising an imaging surface for showing the image pixels, wherein the polarizing structure includes:

a polarizing layer disposed on a side of the 2D display panel facing the image separation device, a phase retardation film disposed on the imaging surface, and an analyzer layer disposed on a side of the lens assembly facing the imaging surface; or polarizing layers which are respectively disposed on two adjacent surfaces of the prism lenses facing the image isolation structure and of which polarization directions are perpendicular to each other, and an analyzer layer disposed on the imaging surface; or polarizing layers which are respectively disposed on two adjacent surfaces of the prism lenses facing the image isolation structure and of which the polarization directions are perpendicular to each other, and an analyzer layer disposed on a side of the lens assembly facing the imaging surface.

6. The 3D display pan& according to claim 2, wherein the lens assembly includes a first lens group and a second lens group; and the first lens group and the second lens group are symmetrical relative to a normal line at a center position of a plane provided with the 2D display panel.

7. The 3D display panel according to claim 1, further comprising an imaging surface for showing the image pixels, wherein the polarizing structure includes:

a polarizing layer disposed on a side of the 2D display panel facing the image separation device, a phase retardation film disposed on the imaging surface, and an analyzer layer disposed on a side of the lens assembly facing the imaging surface; or polarizing layers which are respectively disposed on two adjacent surfaces of the image separation device facing the image isolation structure and of which polarization directions are perpendicular to each other, and an analyzer layer disposed on the imaging surface; or polarizing layers which are respectively disposed on two adjacent surfaces of the image separation device facing the image isolation structure and of which the polarization directions are perpendicular to each other, and an analyzer layer disposed on a side of the lens assembly facing the imaging surface.

8. The 3D display panel according to claim 7, wherein the image isolation structure includes a first light-shielding structure and a second light-shielding structure disposed on the imaging surface; the first light-shielding structure and the second light-shielding structure are disposed on two edges of the imaging surface which are opposite to each other in the row direction; the first light-shielding structure disposed on one side of the imaging surface is configured to shield partial image pixels for forming the right-eye image; and the second light-shielding structure disposed on the other side of the imaging surface is configured to shield the same number of image pixels for forming the left-eye image.

9. The 3D display panel according to claim 8, wherein the first and second light-shielding structures are strips which are extended parallel to the column direction of the array; the first light-shielding structure is configured to shield a plurality of columns of image pixels of the right-eye image disposed on one side of the imaging surface; and the second light-shielding structure is configured to shield a plurality of columns of image pixels of the left-eye image disposed on the other side of the imaging surface.

10. The 3D display panel according to claim 1, wherein the lens assembly includes a first lens group and a second lens group; and the first lens group and the second lens group are symmetrical relative to a normal line at a center position of a plane provided with the 2D display panel.

11. The 3D display panel according to claim 10, wherein, in the row direction, a distance between an axis provided with a focus of each lens in the first lens group and the normal line at the center position of the plane provided with the 2D display panel is an integral multiple of a width of the pixel; and
in the row direction, a distance between an axis provided with a focus of each lens in the second lens group and the normal line at the center position of the plane provided with the 2D display panel is an integral multiple of a width of the pixel.

12. The 3D display panel according to claim 1, wherein the shielding component is a grating or a prism lens.

13. The 3D display panel according to claim 1, further comprising a projecting plane for showing the 3D image pairs, and a light valve controller disposed on the projecting plane, wherein the light valve controller is configured to control brightness of the 3D image pairs.

14. The 3D display panel according to claim 1, further comprising a housing which allows an integration of the 2D display panel, the image separation device, the image isolation structure, the polarizing structure, the lens assembly and the shielding component.

15. The 3D display panel according to claim 1, wherein the lens assembly is configured to allow the image pixels to form inverted and mutually intersected 3D image pairs.

16. The 3D display panel according to claim 1, wherein the polarizing structure allows image light for forming the left-eye image and the right-eye image have different polarization directions.

17. The 3D display panel according to claim 1, wherein the lens assembly is configured to allow an edge of the left-eye image and an edge of the right-eye image in the 3D image pair to be coincided with each other.

18. A display device, comprising the 3D display panel according to claim 1.

* * * * *